June 19, 1962  R. M. ZEEK ET AL  3,039,315
SPEED SENSOR

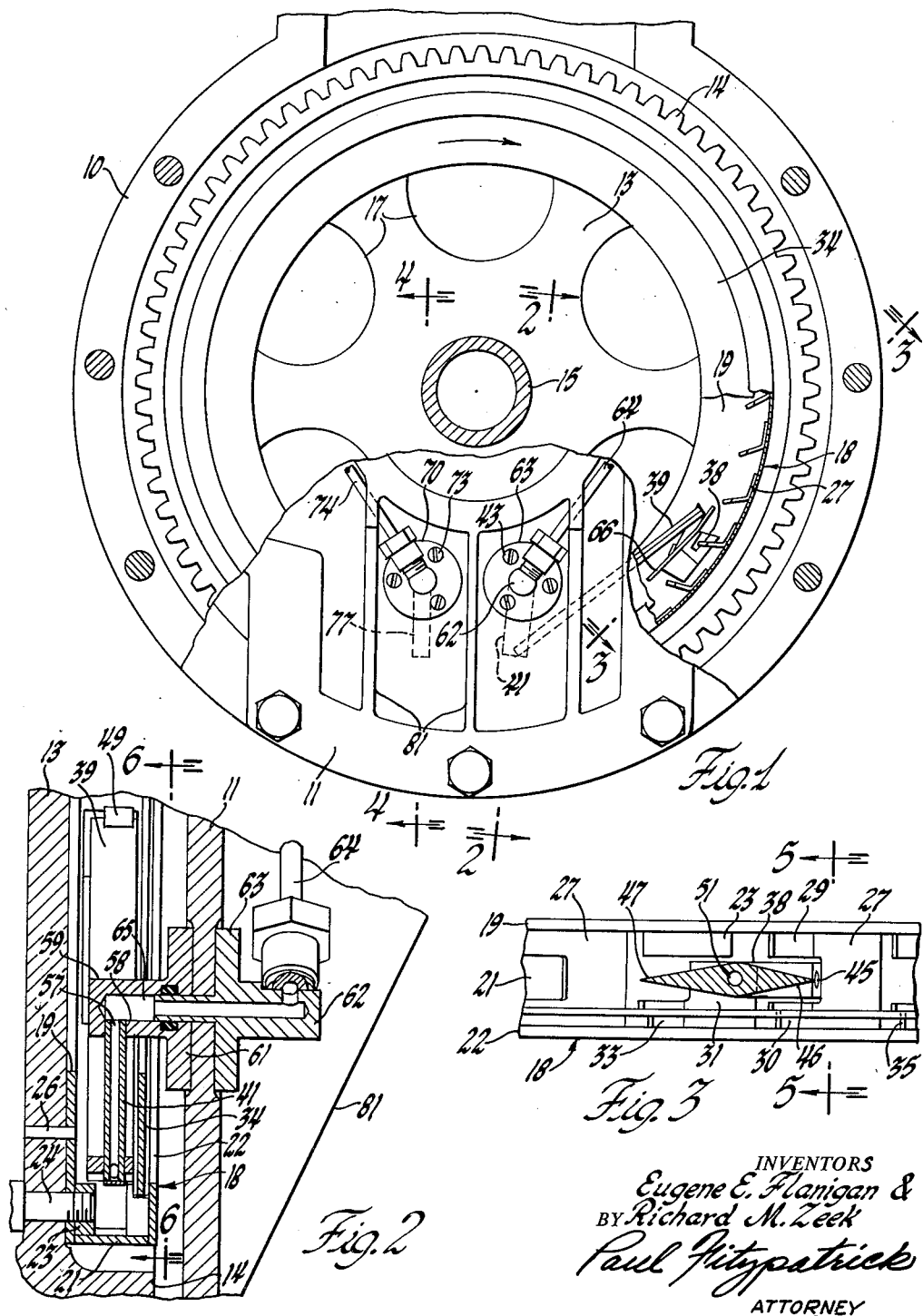

Filed Jan. 13, 1960  2 Sheets-Sheet 2

INVENTORS
Eugene E. Flanigan &
BY Richard M. Zeek

Paul Fitzpatrick
ATTORNEY

United States Patent Office 3,039,315
Patented June 19, 1962

3,039,315
SPEED SENSOR
Richard M. Zeek, Utica, and Eugene E. Flanigan, Detroit, Mich., assignors to General Motors Corporation, Detroit, Mich., a corporation of Delaware
Filed Jan. 13, 1960, Ser. No. 2,265
5 Claims. (Cl. 73—497)

Our invention is directed to improvements in devices of the liquid impact type for sensing the speed or rotation of various mechanisms. A device of this type generally comprises an inwardly open channel ring mounted on a member the speed of rotation of which is to be measured, means for keeping the channel full of oil or other liquid, and an impact pressure probe or Pitot tube disposed in the rotating annulus of oil. The total pressure sensed by the probe is an indication of the speed of rotation of the member.

The most important aspect of our invention lies in the provision of means for varying the position of the probe as a function of temperature changes of the oil so as to eliminate or minimize errors in the speed sense which are otherwise caused by variations in the density of the oil due to changes in its temperature. This addition to previously known fluid impact type speed sensors is quite important, since the temperature of the oil in the rotating annulus may vary widely, creating significant errors in the speed measurement in the absence of the temperature compensation of our invention.

Certain other features of the preferred embodiment of the invention are noteworthy; particularly, improved structure for containing the oil and for preventing undue splashing or disturbance of the oil which might otherwise deplete the oil in the channel.

A liquid impact speed sensor of this type may be used in connection with a suitably calibrated pressure gauge to provide a tachometer. It is particularly suited for use in combination with suitable pressure responsive mechanism as an engine speed governor. Since the impact pressure of the liquid is a measure of rotational speed, a suitable piston or diaphragm moved by this pressure may operate a valve controlling the supply of fuel or motive fluid to an engine so as to govern its speed. Our invention is not concerned with the indicating or controlling device which may respond to our speed sensor, and since these may be of types known in the art, such responsive devices will not be further described.

The principal objects of the invention are to provide an improved and accurate liquid impact type speed sensing device and to provide such a device which is compensated for temperature changes of the liquid employed.

The nature of the invention and the advantages thereof will be apparent to those skilled in the art from the succeeding detailed description and the accompanying drawings of the preferred embodiment of the invention.

Referring to the drawings,

FIGURE 1 is an elevation view, with parts cut away and in section, of a speed sensing assembly.

FIGURE 2 is an enlarged sectional view taken on the plane indicated by the line 2—2 in FIGURE 1.

FIGURE 3 is a fragmentary sectional view taken on the plane indicated by the line 3—3 in FIGURE 1.

Figure 4:
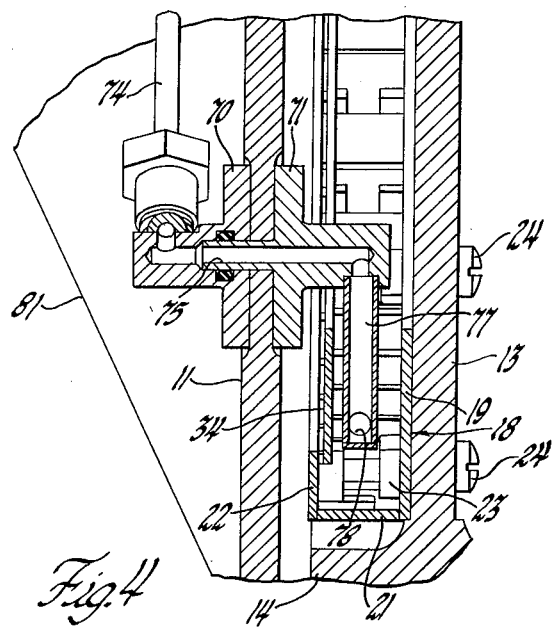
FIGURE 4 is a fragmentary sectional view taken on the plane indicated by the line 4—4 in FIGURE 1.

The invention, as illustrated, is incorporated in a reduction gear for a gas turbine engine of known type such as that described in U.S. patent application Serial No. 559,475, filed January 16, 1956, of common ownership with this application. The reduction gear assembly comprises a case 10 having a cover 11 bolted thereon. A gear 13, including a toothed rim 14, is integral with a shaft 15 supported in the case and cover by bearings, not illustrated. The web of the gear may have lightening holes 17. Gear 13 is adapted to be driven by a pinion (not shown) on a turbine shaft. An annular liquid channel 18, which is a unitary welded or brazed assembly, is mounted on the gear 13 concentric with its axis. The channel 18 comprises an inner or mounting flange 19 which lies against the web of the gear, a cylindrical perimetric ring 21, and an outer flange 22, which together define the inwardly open liquid channel. A number of nuts 23, preferably eight, are welded or brazed to the flange 19. These nuts receive cap screws 24 which pass through the web of gear 13. Two pins 26 fitted closely in holes in the web of the gear and the flange 19 accurately align the channel assembly with the gear.

Figure 5:
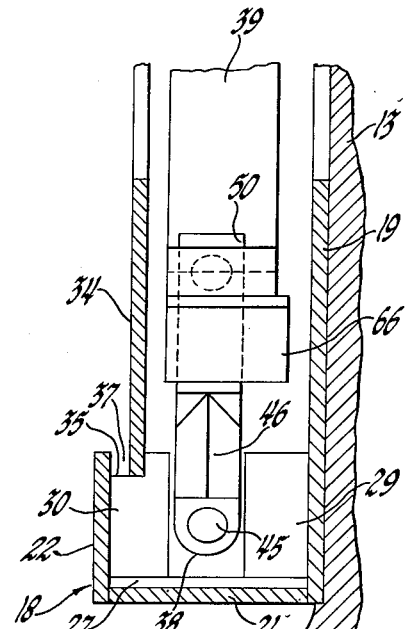
FIGURE 5 is a fragmentary sectional view taken on the plane indicated by the line 5—5 in FIGURE 3.
Figure 6:
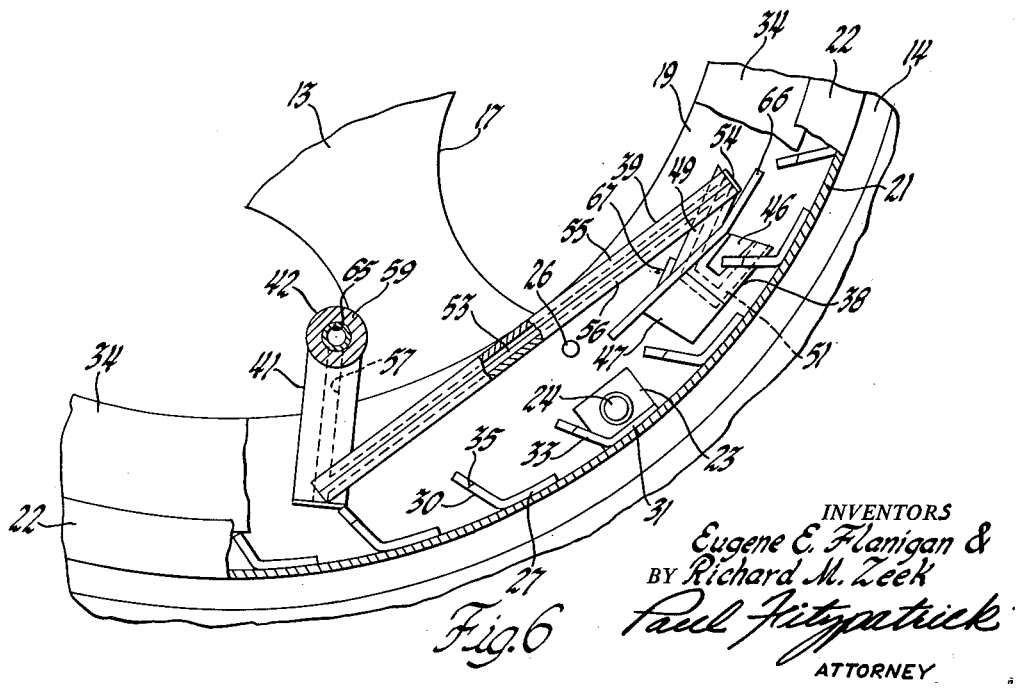
FIGURE 6 is a partial sectional view taken on the plane indicated by the line 6—6 in FIGURE 2.

A considerable number of vanes 27 which, as will be seen from FIGURES 3, 5, and 6, are bent sheet metal pieces of more or less U-shaped configuration, are spot-welded or brazed to the rings 19, 21, and 22. The upstanding forwardly raked portions 29 and 30 of these vanes aid in assuring that the liquid (which is preferably oil, and will be so referred to) in the channel 18 rotates at essentially the same speed as the gear 13. The gear rotates clockwise as viewed in FIGURE 1. To provide clearance for nuts 23, vanes 31 having a single projection 33 are mounted opposite the nuts. The channel assembly 18 also includes an outer ring or baffle 34 which is brazed in place in notches 35 in the outer vanes 30 and 33. It will be noted that an annular gap 37 is left between the outer flange 22 and the baffle 34 so that the level of the liquid annulus in the channel is maintained even with the inner margin of flange 22. The ring 34 is provided to intercept all oil splashed by the probe, since it extends beneath the level of the oil, and return it to the channel, the gap 37 allowing any excess oil to escape.

The impact head or dynamic head of the oil in channel 18 is sensed by a total pressure or Pitot probe 38 fixed to a strut 39 in turn fixed to a post 41 mounted on a support 42 which is fixed to the cover 11 by screws 43 (FIGURE 1). The probe 38 has an inlet 45 facing the direction of liquid movement and has wedge-shaped leading and trailing edge portions 46 and 47 and a portion 49 which is brazed to the strut 39. The portion 49 lies within a notch 50 in the outer end of strut 39. A U-shaped pressure connection or duct 51 in the probe 38 communicates with a further pressure connection 53 extending the length of the strut 39. A light sheet metal plate 54 brazed to the outer end of the strut eliminates an outlet at the end of the probe assembly. The strut 39 is of bimetallic material comprising a layer 55 of metal of a given coefficient of thermal expansion and a layer 56 of metal of a lower coefficient of thermal expansion so that the strut 39 is deformed by increase in temperature to move the probe 38 radially outwardly.

The fixed end of the bimetal strut 39 has a slot cut in it and embraces the rectangular post 41 which defines a passage 57. The other end of the post 41 is brazed in a milled slot 58 in a boss 59 of the support 42, which also includes a bolting flange 61. An external connection fitting 62 provides for attachment of a pressure line 63 extending to an indicator or governor by conventional tube fittings. The fitting 62 has a bolting flange 60 and includes a hollow boss which extends into a recess 65 in the boss 59, an O-ring seal being provided to prevent leakage. The flange 63 is held to the outer surface of the cover 11 by the capscrews 43 which are threaded into the flange 61. As will be seen, the impact pressure of the fluid sensed at opening 45 is communicated through the passages 51, 53, 57 and 65 and through fitting 62 to the tube 64.

The oil flowing through passage 53 in the bimetal strut 39 increases transmission of heat from the oil to the strut to maintain the strut at the temperature of the oil, thereby assuring accurate temperature compensation. Oil flow occurs as the pressure responsive mechanism responds to pressure variations and from leakage at the responsive mechanism. If the responsive mechanism is not of a type which inherently leaks, a small leakage orifice may be built into the responsive device or into the pressure sensing structure to provide a small continuous flow through the strut. Such a leakage orifice could be provided from passage 57 or recess 65, for example.

In order to minimize disturbance of the oil and splashing thereof from the channel 18 by the probe 38, a slightly cambered or bent plate 66 which fits around the probe and extends generally parallel to the direction of movement of the oil is fixed to the probe. The plate 66 includes a struck out tab 67 which is brazed to the surface of the probe. The forward end of the plate lies ahead of the inlet 45 to the probe, and the plate extends rearwardly beyond the wedge-shaped portion 47.

The means for supplying oil to keep the channel 18 properly filled, which is similar to the support for the strut 39, is illustrated in FIGURES 1 and 4. This structure comprises an outer fitting 70 and an inner fitting 71 which are secured together on opposite sides of the cover 11 by capscrews 73. A tube 74 coupled to the fitting 70 is supplied with oil from any suitable source, such as the engine lubrication pump. A nose 75 on the fitting 71 pilots into the fitting 70 and is sealed by an O-ring. A radially extending tube 77 fixed to the support 71 has an oil outlet 78 in its outer end which discharges the oil in the direction of rotation of the gear 13. The channel 18 is thus kept full of oil and the oil level is maintained at a precise constant value by spillage over the lip of the outer flange 22.

The cover 11 has three stiffening ribs 81, through two of which the tubes 64 and 74 may pass.

The operation of the device should be clear from the foregoing, but may be reviewed briefly. The support 42 is fixed in place so that the probe 38 is at a definite distance form the axis of the channel 18 and the opening 45 lies within the channel. The setting should be established at some definite temperature. Upon heating of the oil due to operation of the engine, its density becomes less, and therefore the velocity head due to rotation at any given speed of the oil annulus decreases; however, the bimetal strut 39 is heated by conduction from the probe, by radiation from the oil and the metal parts around it, and by any oil flow through it, so that it bends and moves the probe outwardly with increasing tempearture and inwardly with decreasing temperature. By proper selection of the length of the strut 54 with respect to its increment of curvature for a given temperature increment and the density against temperature characteristic of the oil, a quite satisfactory compensation for the effect of varying oil density may be achieved. Thus, the error in the relation between impact pressure and speed which would otherwise occur as a result of varying oil temperature is greatly reduced so that it is no longer a serious hindrance to the use of a liquid impact speed sensing device. In the specific installation in which the invention has been tested, the speed error of the probe without temperature compensation is about ten percent. The bimetal support reduces this error due to temperature to about 0.1 percent. This may be accomplished by a relatively small movement of the pressure head, about $1/10$ inch in the illustrated embodiment.

The combination of the partially streamlined shape of the probe, the plate 66, and the baffle 34 inhibits undue loss of oil when it passes the probe, so that only a reasonable replenishment is required.

The detailed description of the preferred embodiment of the invention for the purpose of explaining the principles thereof is not to be considered as limiting or restricting the invention, since many modifications may be made by the exercise of skill in the art within the principles of the invention.

We claim:

1. A hydraulic speed sensing device comprising, in combination, a rotatable member defining an inwardly-open annular channel adapted to contain a liquid during rotation of the member, means in the channel to cause the liquid to rotate with the member, a total pressure probe having an inlet disposed in the channel facing the direction of approach of the rotating liquid, a mount for the probe including a fixed support and a bimetal strut connecting the probe to the support, the strut deflecting in response to temperature of the liquid so as to move the probe radially outward to compensate for decrease in density of the liquid with temperature.

2. A hydraulic speed sensing device comprising, in combination, a rotatable member defining an inwardly-open annular channel adapted to contain a liquid during rotation of the member, means in the channel to cause the liquid to rotate with the member, a total pressure probe having an inlet disposed in the channel facing the direction of approach of the rotating liquid, a mount for the probe responsive to temperature of the liquid so as to move the probe radially outward to compensate for decrease in density of the liquid with temperature, and a splash-inhibiting plate mounted on the probe radially inwardly of the inlet, the plate projecting axially of the rotatable member beyond the sides of the probe.

3. A hydraulic speed sensing device comprising, in combination, a rotatable member defining an inwardly-open annular channel adapted to contain a liquid during rotation of the member, means in the channel to cause the liquid to rotate with the member, a total pressure probe having an inlet disposed in the channel facing the direction of approach of the rotating liquid, and a mount for the probe including a fixed support and a bimetal strut connecting the probe to the support, the strut deflecting in response to temperature of the liquid so as to move the probe radially outward to compensate for decrease in density of the liquid with temperature, the strut and support defining a pressure connection from the probe.

4. A hydraulic speed sensing device comprising, in combination, a rotatable member defining an inwardly-open annular channel adapted to contain a liquid during rotation of the member, means in the channel to cause the liquid to rotate with the member, a total pressure probe having an inlet disposed in the channel facing the direction of approach of the rotating liquid, a mount for the probe including a fixed support and a bimetal strut connecting the probe to the support, the strut deflecting in response to temperature of the liquid so as to move the probe radially outward to compensate for decrease in density of the liquid with temperature, the strut and support defining a pressure connection from the probe, and a splash-inhibiting plate mounted on the probe radially inwardly of the inlet.

5. A hydraulic speed sensing device comprising, in combination, a rotatable member defining an inwardly-open annular channel adapted to contain a liquid during rotation of the member, means in the channel to cause the liquid to rotate with the member, a total pressure probe having an inlet disposed in the channel facing the direction of approach of the rotating liquid, a radially movable mount for the probe, means responsive to temperature of the liquid connected to the probe so as to move the probe radially outward to compensate for decrease in density of the liquid with temperature, and an annular baffle ring rotating with the channel and disposed radially and axially within the channel extending radially inwardly from the channel operative to intercept liquid disturbed by the probe and return it to the channel, the channel and baffle ring being spaced to define between them an annular overflow path for the said liquid.

References Cited in the file of this patent

UNITED STATES PATENTS

| | | |
|---|---|---|
| 2,258,770 | Kleinman | Oct. 14, 1941 |
| 2,857,150 | Sharp | Oct. 21, 1958 |

FOREIGN PATENTS

| | | |
|---|---|---|
| 965,366 | France | Feb. 15, 1950 |
| 315,900 | Germany | Nov. 15, 1919 |
| 154,529 | Great Britain | Nov. 3, 1921 |
| 217,559 | Great Britain | Jan. 15, 1925 |
| 52,032 | Netherlands | Mar. 16, 1942 |